United States Patent [19]

Sugiyama

[11] Patent Number: 5,191,257
[45] Date of Patent: Mar. 2, 1993

[54] ARMATURE OF DC MOTOR
[75] Inventor: Takeshi Sugiyama, Hyogo, Japan
[73] Assignee: Mitsubishi Denki K.K., Tokyo, Japan
[21] Appl. No.: 835,486
[22] Filed: Feb. 14, 1992
[30] Foreign Application Priority Data
  Feb. 18, 1991 [JP] Japan .................... 3-046166
[51] Int. Cl.$^5$ ........................... H02K 23/26
[52] U.S. Cl. ..................... 310/198; 310/207; 310/208; 310/234
[58] Field of Search ............ 310/234, 206, 207, 198, 310/208, 261, 177, 154, 195; 290/28, 38 R, 48
[56] References Cited

U.S. PATENT DOCUMENTS

| | | | |
|---|---|---|---|
| 1,742,112 | 12/1929 | Welsch | 310/207 |
| 3,705,459 | 12/1972 | Biddson | 310/207 |
| 3,818,257 | 6/1974 | Porter | 310/198 |
| 4,270,065 | 5/1981 | Major | 310/207 |
| 4,583,016 | 4/1986 | Ban | 310/198 |
| 4,707,629 | 11/1987 | Wasko | 310/207 |
| 4,933,586 | 6/1990 | Gotou | 310/198 |
| 5,044,065 | 9/1991 | Dyke | 310/234 |
| 5,072,129 | 12/1991 | Sugiyama | 310/207 |

Primary Examiner—R. Skudy
Attorney, Agent, or Firm—Sughrue, Mion, Zinn, Macpeak & Seas

[57] ABSTRACT

The present invention relates to an armature of a wave winding type for a D.C. motor wherein the number of commutator bars is reduced to half the number of slots in the armature coil. Each armature winding is formed by interconnecting two coils at a common front head portion and includes four straight portions accommodated in separate slots with connecting end portions being secured, respectively, to two commutator bars.

4 Claims, 1 Drawing Sheet

ARMATURE OF DC MOTOR

BACKGROUND OF THE INVENTION

This invention relates to the armature of a direct current (d.c.) motor whose armature coils are of wave winding type.

FIG. 3 is an developmental view of an armature coil of a conventional d.c. motor. The armature coil 1 is of a wave winding type, and has a straight portion 1b of the lower coil and a straight portion 1d of the upper coil, which are connected together through a rear head portion 1c, and a connecting leg portion 1a of the lower coil and a connecting leg portion 1e of the upper coil which are extended from the straight portions 1b and 1d. The motor has a plurality of armature coils 1; that is, the number of armature coils 1 is equal to the number of slots in the armature core. The lower straight portions 1b and the straight portion 1d are inserted into the slots of the armature core successively. In general, the commutator bars of the commutator are equal in number to the slots. For instance, in the case of a wave winding of six poles and twenty-eight slots, the number of the commutator bars is twenty-eight (28). The lower connecting leg portions 1a and the upper connecting leg portions 1e of the armature coils 1 are connected to the respective commutator bars by soldering, thus forming an armature winding of a wave winding type.

In the above-described conventional d.c. motor's armature, the number of the commutator bars is equal to that of the slots in the armature core. When, because of the characteristic of an electric motor, the number of armature slots is increased. It is necessary to increase the number of commutator bars, and accordingly to decrease the thickness of the brushes. If the thickness of the brushes is decreased excessively, the mechanical strength is decreased, and the service life is also shortened. If, on the other hand, the brush thickness is increased, it is necessary to increase the thickness of the commutator bars. In this case, the commutator is increased in outside diameter, the armature is also increased in outside diameter, and the brush device is increased in radial dimension. Thus, the resultant motor is increased in outside diameter.

If, in the case where the increase in outside diameter of the motor is limited, it is necessary to increase the outside diameter of the commutator, then it is necessary to decrease the height of the brushes also. This decrease will reduce the service life of the brushes.

SUMMARY OF THE INVENTION

An object of this invention is to eliminate the above-described difficulties accompanying a conventional DC motor's armature. More specifically, an object of the invention is to provide a d.c. motor's armature in which, in the case where the number of armature slots is equal to that of a conventional armature, when compared with the conventional armature the commutator is decreased in outside diameter, and the brushes are increased in height and service life. Also, the number of slots in the armature core can be increased, and the designing thereof is improved in the degree of freedom.

In an armature in a d.c. motor, according to the invention, the number of commutator bars is reduced to a half of the number of slots formed in a armature core, armature coils are of wave winding type, each of which is formed by connecting a pair of coils, which are spaced a pitch of two poles from each other and equal in polarity to each other, through a common front head portion forming the front end portion thereof. Each of the armature coils has a lower connecting leg portion on the side of one of the two poles, and an upper connecting leg portion on the side of the other pole which is spaced a pitch of two poles from the one pole. Those leg portions are connected to the respective commutator bars.

In the armature of the invention, the number of commutator bars is a half of that of slots formed in the armature core. Hence, the commutator bars can be increased in thickness as much, and the brushes can also be increased in thickness. When compared with the conventional armature, the commutator can be decreased in outside diameter. Each of the armature coils of wave winding type is formed by connecting a pair of coils which are spaced a pitch of two poles from each other and are equal in polarity to each other. This will contribute to improvement of the productivity of the armature.

DESCRIPTION OF THE PREFERRED EMBODIMENT

Figure 1:
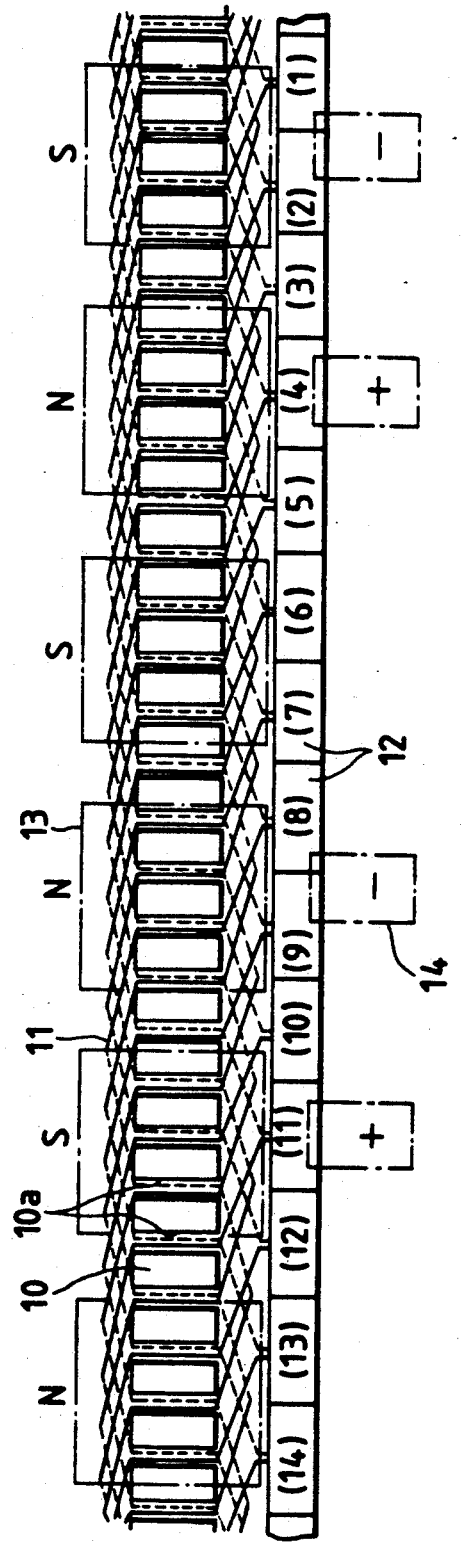
FIG. 1 is an armature winding connection diagram showing one example of a d.c. motor's armature according to this invention.
Figure 3:
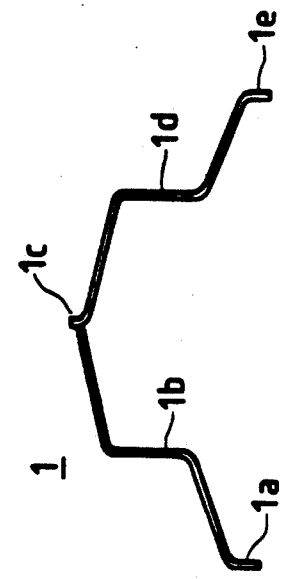
FIG. 3 is a developmental view of a conventional DC motor's armature coil.

FIG. 1 is an armature winding connection diagram showing one example of a d.c. motor's armature according to this invention. The armature is of six poles, twenty-eight slots, a wave winding (rear pitch of 5, and front pitch of 4), and fourteen commutator bars. In FIG. 1, reference numeral 10 designates an armature core; 10a, slots formed in the armature core 10; 11, armature coils of wave winding type; 12, commutator bars; 13, magnetic pole cores; and 14, brushes. Further in FIG. 1 the lower coil is indicated by the dotted lines, and the upper coil, by the solid lines.

Figure 2:
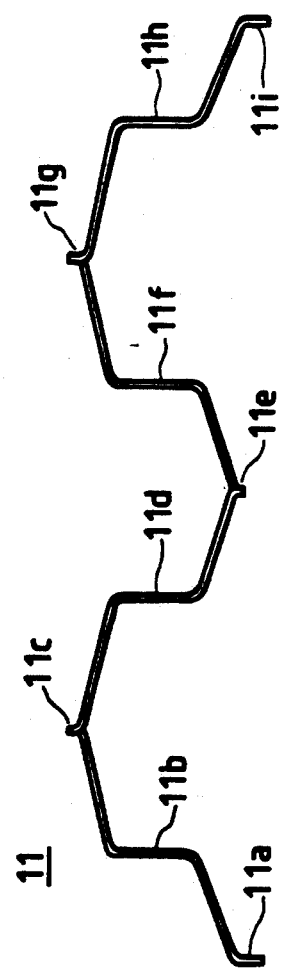
FIG. 2 is a developmental view of an armature coil shown in FIG. 1.

FIG. 2 is a developmental view of an armature coil 11 shown in FIG. 1. In FIG. 2, reference characters 11b and 11d designates a lower straight portion and an upper straight portion of on the side of a first pole, respectively, and 11c, a rear head portion. Further in FIG. 2, reference characters 11f and 11h designate a lower straight portion and an upper straight portion of the side of a second pole which is the same in polarity as the first pole and is spaced a pitch of two poles from the first pole; and 11g, a rear head portion. These two coils equal in polarity are coupled to each other through a common front head portion 11e, thus forming the armature coil. The straight portions 11b and 11d, and 11f and 11h of the armature coils 11 thus formed are inserted into the slots 10a of the armature core 10. The lower connecting leg portions 11a and the upper connecting leg portions 11i of the armature coils 11 are connected to the respective commutator bars 12, for instance, by soldering.

As was described above, the number of commutator bars 12 is a half (½) of that of armature core slots, and, when compared with the conventional armature, the commutator can be reduced in outside diameter, the brushes can be increased in height. In addition, the commutator bars 12 can be increased in thickness, and therefore, when compared with the conventional armature, the brushes are increased in thickness, and the mechanical strength is increased. Each armature coil 11 corresponds to two conventional armature coils which are connected to each other. Thus, the number of armature coils is halved, which contributes to improvement of the productivity of the armature.

In the armature of the present invention, the number of commutator bars is equal to half the number of commutator bars in the conventional armature. However, in the case of a low voltage motor, no trouble occurs with commutation because the voltage between commutator bars is low. Particularly an armature is used as a starter motor (not shown) no trouble occurs with commutation, because it is operated on low voltage, and moreover it is not driven continuously but, rather, is used for a short time.

As was described above, in the d.c. motor's armature according to the invention, the number of commutator bars is reduced to a half of that of slots formed in the armature core. Hence, when compared with the conventional armature, the commutator can be reduced in outside diameter, and accordingly, the brushes can be increased in height, thereby increasing the service life as well. In addition, the commutator bars can be increased in thickness, and accordingly, the brushes are increased in thickness, thereby increasing the mechanical strength. Furthermore, since each armature coil of wave winding type corresponds to two conventional armature coils connected to each other, the armature of the invention is higher in productivity than the conventional armature. In addition, the number of armature slots can be increased without higher degrees of freedom in the design of the armature are possible the designing of the armature of the invention is higher in the degree of freedom.

What is claimed is:

1. An armature for a direct current motor, said armature comprising:
    an armature core including a predetermined number of slots formed therein;
    half as many commutator bars as said predetermined number of slots;
    at least one wave winding type armature coil, said at least one wave winding type armature coil comprising a pair of separate, interconnected coils inserted in said slots, said coils being interconnected at a common front head portion, separated by a distance of two magnetic poles over said armature core, and equal in polarity; and
    said at least one wave winding type armature coil further comprising upper and lower connecting leg portions at opposite ends thereof, respectively, for connecting said at least one, wave winding type armature coil to said commutator bars.

2. An armature for a direct current motor, as recited in claim 1, wherein said at least one wave winding type armature coil further includes at least four straight portions, each of said at least four straight portions being accommodated in a respective slot.

3. An armature for a direct current motor, as recited in claim 1, wherein said connecting leg portions are soldered to said commutator bars.

4. An armature for a direct current motor, as recited in claim 1, said armature is used as a starter motor.

* * * * *